O. Nicour,
Camera Attachment.
No. 71,205.   Patented Nov. 19, 1867.
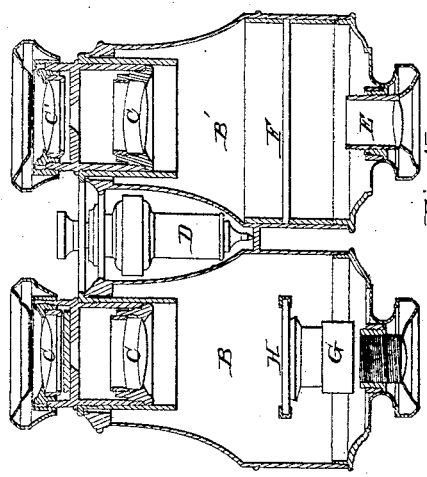
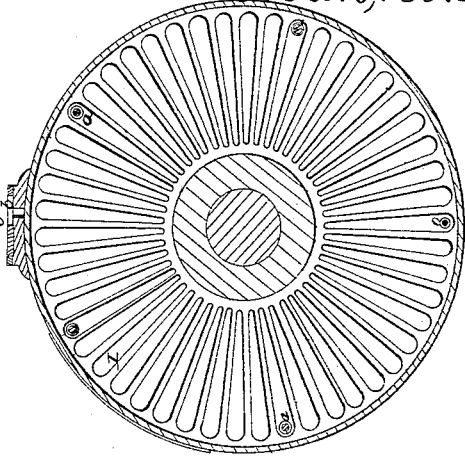
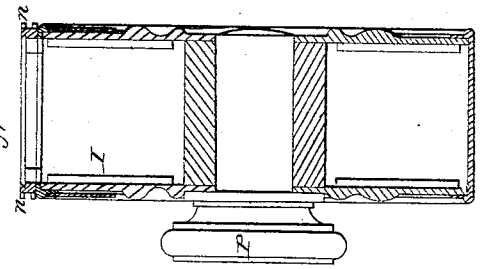
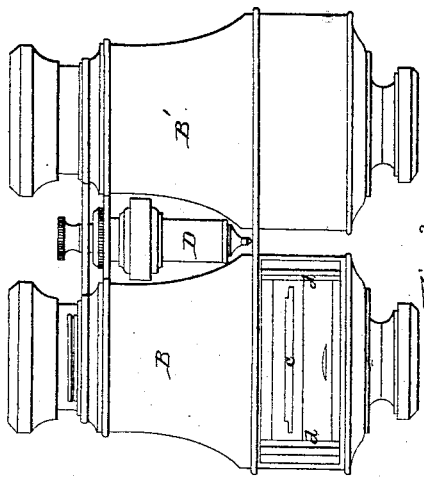
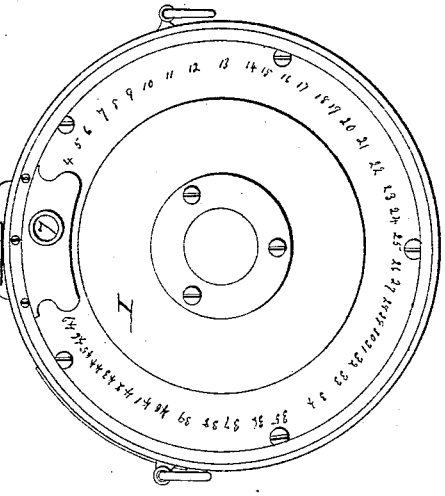
Witnesses:
Inventor;
Octave Nicour
per Brown Coombs & Co
Atty.

United States Patent Office.

OCTAVE NICOUR, OF PARIS, FRANCE.

Letters Patent No. 71,205, dated November 19, 1867.

---

PHOTOGRAPHIC APPARATUS.

---

The Schedule referred to in these Letters Patent and making part of the same.

---

TO ALL WHOM IT MAY CONCERN:

Be it known that I, OCTAVE NICOUR, of Paris, in the empire of France, have invented a new and useful Photographic Jumelle, (Double Opera-Glass;) and I do hereby declare that the following is a full, clear, and exact description of the same, reference being had to the accompanying drawing, forming part of this specification, and in which—

Figure 1 represents a plan view of the double opera-glass or one portion of the device.

Figure 2, a horizontal section of the same.

Figure 3, an end view of the box-portion of the same, for holding the prepared plates or glasses, and which sits upon or over the photographing division of the double opera-glass; and Figures 4 and 5, sections at right angles to each other of said box.

This invention is made up of two main parts or portions, the one of which is accessory to the other, namely, a photographing device resembling a double opera-glass, and which, for the sake of distinction, may be so termed, and distributory box or repository of prepared plates or glasses. The two tubes of the opera-glass are furnished with photographic lenses, identical in focus, angle, and other respects. One of these lenses serves to project the image to be taken on to a finely-ground glass, which occupies the largest part of the expanded tube. At precisely the same focal distance the other tube is provided with a small dark chamber to receive the prepared and sensitized glass. It is evident that, the two lenses being identical, the focus being found of one upon the ground glass, will be perfect on the prepared plate, which may be readily dropped into its place from the box, which is the accessory to this invention. This box, which will readily be understood from the drawing, may be of cylindrical form and any suitable size, say six inches in diameter and two and two-thirds inches thick, and be constructed to contain any desired number, say forty-eight, prepared glasses, which are brought, by the movement of a central button, one after another, directly over a door or trap, which corresponds in form, size, &c., with the door or opening, into the dark chamber. These doors may be made to open and shut automatically when taking a view. The circular box is slid over the opening in the dark chamber; the door of this is opened either by a separate movement or by the simultaneous opening of the door of the box. The two openings being one over the other, and both opened, a glass drops into the chamber, when, the focus having been already formed, the stop is removed and the picture taken. The box is replaced, the doors opened, the instrument turned over, the glass falls back into its place, a slight movement is given to the button, and another glass takes its place over the door or opening. The place of each glass is numbered. When the amateur or operator returns, he removes the glasses, which may have been exposed in a room, or with a light adapted to the purpose, and refills the box.

In the drawings, B B' represent the double opera-glass mounting; C C C' C' are the two lenses; D is the milled screw by which the lenses are moved, so as to find the focus; F in B' is the ground glass. In the tube B is the small dark chamber, and H the prepared glass. E is a weak magnifying glass, for the purpose of facilitating the finding of the focus. G is a screw, which forces at the moment of use the prepared glass into its exact place with relation to the distance from the glass C C. I is the box for containing, in suitable grooves or divisions, the prepared plates or glasses and pictures after they are taken, and made capable, that is, the interior portion of it, of turning by means of a button, P, by which the glasses, one after another, are brought over the opening $b$, that communicates with the opening $c$, when the box is in its place, by sliding a projection, $n$, of it along grooves $d\,d$ over the dark chamber. By this arrangement the prepared glasses are dropped or inserted in succession to their place in the dark or photographing chamber, and, on reversing the instrument, the picture removed therefrom without exposure to the light.

This instrument or apparatus, as an entirety, may be termed a "jumelle photographique."

What is claimed, and desired to be secured by Letters Patent, is—

1. The apparatus or instrument as a whole for photographing purposes, substantially as specified.

2. The combination of lenses C C C' C', of equal focal distance, and forming part of one and the same apparatus, and serving, the one set for finding the focus and the other for the production of the picture upon the prepared glass sheet or plate, substantially as specified.

3. The combination of the lenses C C C' C', adjusting-screw D, tubes B B', with their dark and light chambers, the one for holding the ground glass F, or its equivalent, for projection of the image, and the other provided with a slot or opening, c, for receiving the prepared glass sheet or plate H on which the picture is taken, essentially as herein set forth.

4. In combination with the tubes B B' and lenses as described, the adjusting-screw G.

5. The combination with a photographing device, made up of tubes, lenses, and dark and light chambers, essentially as specified, of a box, I, constructed to hold the prepared glasses, sheets, or plates, and operating to insert the same in succession or at pleasure within the photographing chamber, and to receive the picture therefrom, without, during such transfer, exposure to the light, substantially as herein set forth or in any other equivalent manner.

OCTAVE NICOUR.

Witnesses:
    CHR. CESAR BONFANTI,
    A. LE BLANC.